3,008,980
**METHOD FOR UTILIZING WASTE POLYETHYL-
ENE TEREPHTHALATE MATERIALS**
Ewald Katzschmann, Dortmund-Kruckel, Germany, assignor to Chemische Werke Witten Gesellschaft mit beschrankter Haftung
No Drawing. Filed May 27, 1958, Ser. No. 738,024
Claims priority, application Germany May 29, 1957
5 Claims. (Cl. 260—475)

This invention relates to a method of utilizing waste polyester materials. More particularly, it relates to the conversion of such waste polyester materials to the dimethyl ester of terephthalic acid.

In the manufacture or processing of polyesters of terephthalic acid, considerable waste material in the form of fibers, threads, small pieces, etc., is accumulated. Such waste products can not be used as such for the production of useful articles of manufacture, but nevertheless their use is desirable for economic reasons. Hence, there have been various suggestions for the recovery of terephthalic acid from such wastes either in the form of the acid or in the form of the dimethyl ester. One of the procedures heretofore suggested has included saponification with alkalis or acids. However, such techniques involve the use of chemicals which render the recovery of the saponified terephthalic acid expensive. Furthermore, such procedures are unsuitable and uneconomical for they require both precipitation and purification steps. Another procedure suggested in the prior art is an ester interchange reaction with methanol, such interchange reaction taking place under pressure. While such treatment results in the production of the dimethyl ester of terephthalic acid, such ester is not directly suitable for use as a raw material for the usual condensation reaction to form the polyester. The dimethyl ester must first be subjected to extensive purification operations before it may be used as a raw material in condensation reactions. These additional steps make the dimethyl ester so formed more expensive than the dimethyl ester prepared directly from terephthalic acid and methanol, and hence the recovery procedure is uneconomical.

It is therefore an object of the present invention to teach a process for the conversion of waste polyesters of terephthalic acid to the dimethyl ester of terephthalic acid which may be employed in condensation reactions.

It is another object of the present invention to teach an economical process for the conversion of waste polyesters of terephthalic acid to a substantially pure dimethyl ester of terephthalic acid.

It is yet another object of the present invention to teach a process for the conversion of waste polyesters of terephthalic acid to dimethyl ester of terephthalic acid which obviates the need for purification of the dimethyl ester of terephthalic acid before utilization thereof in condensation reactions.

Additional objects and advantages will become apparent from the following detailed description of the present invention.

The present invention is carried out by including the steps of oxidizing p-toluic acid methyl ester or a mixture of p-toluic acid methyl ester and p-xylene. The oxidation is carried out by blowing with air while the reactants are in the liquid phase. The resulting oxidation products are esterified with methanol under pressure. However, it is pointed out that the esterification step is conducted in the presence of waste polyesters of terephthalic acid. In this manner, the waste polyesters of terephthalic acid are converted directly into the dimethyl ester of terephthalic acid. The diester is relatively pure so that there is little need to purify the resultant.

It is stated that the oxidation of p-toluic acid methyl ester or a mixture of p-toluic acid methyl ester and p-xylene is not part of the present invention. In United States Patent No. 2,653,165 and in copending application Serial No. 668,606, filed June 28, 1957, now U.S. Patent 2,894,978, there is disclosed and claimed methods for oxidizing p-toluic acid methyl ester in the liquid phase by means of air-blowing. The resulting oxidation prouct, which includes some phthalic acid, is then formed into the dimethyl ester of terephthalic acid by an esterification process under pressure with methanol.

In the modification and improvement according to the present invention, the polyester waste materials, for example the waste of the polyester of ethylene glycol and terephthalic acid, is cleaned if necessary and then added in fragmented form to the oxidation products of p-toluic methyl ester. The oxidation products are esterified with methanol under pressure while in the presence of waste polyesters of terephthalic acid. By this procedure, the terephthalic acid contanied in the waste polyester is converted directly to the dimethyl ester of terephthalic acid.

The ratio of quantity of polyester waste material to the oxidation products of p-toluic acid methyl ester or a mixture of p-toluic acid methyl ester and p-xylene may vary within wide limitations. For example, the quantity of waste polyester to the mixture of oxidation products and methanol may vary from 0.1 to 95% by weight. In practice, however, concentrations of solids at which the mixture of solid and liquid becomes difficult to handle should not be used. The preferred range of polyester waste materials is between 20–30% by weight more particularly about 25% by weight is desirable.

The following example is given to illustrate the present invention but is not meant to set forth the limits of the present invention.

*Example*

A quantity of an oxidation product of p-toluic acid methyl ester and p-xylene is produced by oxidizing the components in a tank-type oxidizer together with a small amount of cobalt naphthenate catalyst. The oxidation is accomplished by blowing the product with air to produce toluic acids, oxy acids, acetophenone, carbon dioxide, and other products of oxidation. The oxidation process was conducted at a temperature of 40–50° C. for a period of four hours. A pressure of 50 p.s.i.g. was maintained in the reactor during the oxidation step.

200 grams of the oxidation product of p-xylene and p-toluic methyl ester were charged into a reaction vessel. 50 grams of polyester waste material (the polyester of ethylene glycol and terephthalic acid) were added along with sufficient methanol to esterify the oxidation product. The amount of methanol was 300 grams. The reaction vessel was subjected to a superatmospheric pressure of 45–50 atmospheres and a temperature of 230° C. in order to assist in the completion of the esterification step. At the end thereof 128.5 grams of terephthalic acid methyl ester were obtained. The product had a melting point of 140.3° C.

In order to show the advantage of adding polyester waste materials during the esterification step, 200 grams of the oxidation product of p-xylene and p-toluic acid methyl ester obtained by the method set forth in the example were esterified with methanol under superatmospheric conditions. No polyester waste materials were present during the esterification step. The resultant product included only 83 grams of terephthalic acid dimethyl ester.

It will be appreciated that the incorporation into the material to be esterified of 50 grams of polyester waste material resulted in an increase in yield of 45.5 grams of terephthalic acid dimethyl ester.

What is claimed is:

1. A method for producing dimethyl ester of terephthalic acid from polyethylene terephthalate waste which comprises oxidizing p-toluic acid methyl ester with an oxygen-containing gas to produce monomethyl terephthalate as a reaction product and then esterifying the reaction product with methanol in the presence of polyethylene terephthalate waste whereby dimethyl ester of terephthalic acid is produced.

2. A method for producing dimethyl ester of terephthalic acid from polyethylene terephthalate waste which comprises oxidizing p-toluic acid methyl ester with an oxygen-containing gas at a temperature between about 40° to 50° C. and at a pressure of approximately 50 p.s.i.g. to produce mono-methyl terephthalate as a reaction product and then esterifying the reaction product with methanol in the presence of polyethylene terephthalate waste whereby dimethyl ester of terephthalic acid is produced.

3. A method for producing dimethyl ester of terephthalic acid from polyethylene terephthalate waste which comprises esterifying monomethyl terephthalate with methanol in the presence of polyethylene terephthalate waste whereby dimethyl ester of terephthalic acid is produced.

4. A method for producing dimethyl ester of terephthalic acid from polyethylene terephthalate waste which comprises esterifying mono-methyl terephthalate with methanol in the presence of polyethylene terephthalate waste whereby dimethyl ester of terephthalic acid is produced, the proportion by weight of said mono-methyl terephthalate and said polyethylene terephthalate waste being in the ratio of about 4:1.

5. A method for producing dimethyl ester of terephthalic acid from polyethylene terephthalate waste which comprises oxidizing p-toluic acid methyl ester to produce mono-methyl terephthalate as a reaction product and then esterifying the reaction product with methanol in the presence of polyethylene terephthalate materials waste whereby dimethyl ester of terephthalic acid is produced.

References Cited in the file of this patent

UNITED STATES PATENTS

| 2,653,165 | Levine | Sept. 22, 1953 |
| 2,772,305 | Levine et al. | Nov. 27, 1956 |
| 2,884,443 | Siggel et al. | Apr. 28, 1959 |

FOREIGN PATENTS

| 755,071 | Great Britain | Aug. 15, 1956 |
| 1,117,646 | France | Feb. 27, 1956 |